(12) United States Patent
Asano

(10) Patent No.: US 6,212,144 B1
(45) Date of Patent: Apr. 3, 2001

(54) METHOD AND APPARATUS FOR READING DATA

(75) Inventor: Shigetaka Asano, Kasugai (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/133,911

(22) Filed: Aug. 13, 1998

(30) Foreign Application Priority Data

Mar. 13, 1998 (JP) .................................................. 10-063085

(51) Int. Cl.$^7$ ....................................................... G11B 7/00
(52) U.S. Cl. ................................. 369/50; 369/59; 369/47
(58) Field of Search ................................. 369/47, 48, 49, 369/50, 54, 58, 59, 32

(56) References Cited

U.S. PATENT DOCUMENTS

| | | | |
|---|---|---|---|
| 3,898,580 | 8/1975 | Millsap | 331/15 |
| 5,381,359 | 1/1995 | Abbott et al. | 364/724.19 |
| 5,661,709 | * 8/1997 | Takagi et al. | 369/59 |
| 6,111,833 | * 8/2000 | Nakagawa et al. | 369/59 |

FOREIGN PATENT DOCUMENTS 08045089  2/1996  (JP).

OTHER PUBLICATIONS

B. Farhang–Boroujeny; "Variable Step–Size LMS Algorithm: New Developments and Experiments"; Int. Symp. on Circuits and Systems, Digital Signal Processing; vol. 2, May 30, 1994–Jun. 2, 1994; pp. 265–268.

* cited by examiner

Primary Examiner—Muhammad Edun
(74) Attorney, Agent, or Firm—Greer Burns & Crain Ltd.

(57) ABSTRACT

A data reading unit reads analog data stored on a recording medium and converts the analog data to a digital signal synchronously with a clock signal. A waveform equalizer shapes the digital signal using a coefficient. The waveform equalizer also optimizes the coefficient synchronously with the clock signal using an intensity parameter. The waveform equalizer includes a control unit for setting an initial value of the intensity parameter and dynamically adjusting the intensity parameter. The data reader also includes a PLL circuit for generating the clock signal. The PLL circuit may generate the clock signal using a second intensity parameter. The PLL circuit includes a control unit for dynamically altering the second intensity parameter.

43 Claims, 9 Drawing Sheets

METHOD AND APPARATUS FOR READING DATA

BACKGROUND OF THE INVENTION

The present invention relates to a method of reading data on a recording medium, and more specifically to a method of reading data using a self-optimizing waveform equalizer.

As shown in FIG. 1, a head unit 12 reads data stored on a recording medium 11, such as an optical disk, magneto-optical disk, or magnetic disk, and outputs a read signal RD having a voltage corresponding to the state of the data ("1" or "0") to a data reader 13.

The data reader 13 includes a prefilter 14, an automatic gain control amplifier (AGC) 15, an A/D converter (ADC) 16, a waveform equalizer 17, and a PLL circuit 18. The prefilter 14 filters the read signal RD to output a signal having a desired frequency to the AGC 15. The AGC 15 amplifies the output signal from the prefilter 14 to output a signal having a predetermined amplitude. The ADC 16 converts the output signal from the AGC 15 into a digital signal and outputs the digital signal to the waveform equalizer 17.

The waveform equalizer 17 executes waveform shaping of the digital signal by means of an intensity (sensitivity) parameter set in advance, and outputs the waveform-shaped digital signal to a CPU 19 and PLL circuit 18 as a reproduced signal Dout. The CPU 19 generates read-out data consisting of a predetermined number of bits on the basis of the reproduced signal Dout from the waveform equalizer 17. The waveform equalizer 17 includes coefficients used during the waveform shaping.

The PLL 18 generates a clock signal CLK synchronized with the reproduced signal Dout and delivers the clock signal CLK to the ADC 16 and the waveform equalizer 17. The clock signal CLK is used in setting the timing for taking in the data "1" or "0". That is, the ADC 16 samples the signal from the AGC 15 synchronously with the input clock signal CLK, converts the sampled signal into a digital signal, and outputs the digital signal. The waveform equalizer 17 executes an operation synchronously with the input clock signal CLK. The PLL 18 possesses coefficients for synchronizing the clock signal CLK with the read signal RD.

As shown in FIG. 2, a sector of the recording medium 11 includes a preamble (PR) region 21, a training (TR) region 22, a sink byte (SB) region 23, and a data region 24.

The PR region 21 contains a preamble (PR) code used to synchronize the clock signal CLK from the PLL circuit 18 with the read signal RD. The bits of the PR code may all be "1", for example, and the read signal RD of the PR code may be a sine wave.

The TR region 22 contains a training (TR) code used to optimize the performance of the waveform equalizer 17. The TR code is bit data, for example, "001100111", and contains high frequency components and low frequency components as an analog signal.

The SB region 23 contains a sink byte (SB) code used to detect the start of the data region 24. The CPU 19 treats bit data following the SB code as record data and performs a process to the record data.

The PLL circuit 18 synchronizes the clock signal CLK with the read signal RD using the output signal from the waveform equalizer 17. The waveform equalizer 17 optimizes its coefficients, even when the PLL circuit 18 is in operation. When the output signal Dout input to the PLL circuit 18 varies, the PLL circuit 18 alters the frequency of the clock signal CLK. At this time, there is a possibility that the PLL circuit 18 cannot converge the coefficients while the PR code is being read. That is, the PLL circuit 18 may not be able to synchronize the clock signal CLK with the read signal RD. Also, the waveform equalizer 17 may not be able to optimize its coefficients by some chance, while the TR code is being read out. This makes it difficult to read data from the recording medium 11 or increase the read-out time. Such problem have been an obstacle preventing increasing the speed of data processing, the recording density of the recording medium 11, and the rotation speed (high speed read-out) of the recording medium.

It is therefore an object of the present invention to provide an improved method of reading data stored on a recording medium.

SUMMARY OF THE INVENTION

To achieve the above objective, the present invention provides a data reading apparatus for reading data recorded on a recording medium, the data reading apparatus comprising: an A/D converter that receives a read signal and a clock signal, the read signal including the recorded data and a control data for controlling a read out operation of the recorded data, and converts the read signal into a digital signal synchronously with the clock signal; and a waveform equalizer having a coefficient relate to a waveform of the digital signal and an intensity parameter, wherein the waveform equalizer receives the digital signal and the clock signal, optimizes the coefficient synchronously with the clock signal by an operation employing the intensity parameter and the digital signal, and shapes the waveform of the digital signal in accordance with the optimized coefficient to generate a reproduced signal, wherein: the intensity parameter has a predetermined initial value, the waveform equalizer includes a control unit for adjusting a value of the intensity parameter, and the control unit sets the value of the intensity parameter to a value larger than the initial value when the waveform equalizer optimizes the coefficient.

The present invention further provides a data reading apparatus for reading data recorded on a recording medium, the data reading apparatus comprising: an A/D converter that receives a read signal and a clock signal, the read signal including the recorded data and control data for controlling a read out operation of the recorded data, and converts the read signal synchronously with the clock signal into a digital signal; a waveform equalizer for shaping a waveform of the digital signal and generating a reproduced signal; and a PLL circuit for generating the clock signal synchronized with the reproduced signal using an intensity parameter, wherein: the intensity parameter has an initial value, the PLL circuit includes a control unit for adjusting a value of the intensity parameter, and the control unit adjusts the value of the intensity parameter to a value larger than a predetermined value when the PLL circuit generates the clock signal synchronized with the reproduced signal.

The present invention provides a data reading apparatus for reading data recorded on a recording medium, the data reading apparatus comprising: an A/D converter that receives a read signal and a clock signal, the read signal including the recorded data and control data for controlling a read out operation of the recorded data, and converts the read signal to a digital signal synchronously with the clock signal; a waveform equalizer having a coefficient in relation to a waveform shaping of the digital signal and a first intensity parameter, receives the digital signal and the clock signal, optimizes the coefficient synchronously with the clock signal using the first intensity parameter and the digital signal, and performs waveform shaping of the digital signal in accordance with the optimized coefficient and the first intensity parameter to generate a reproduced signal, wherein the intensity parameter has an initial value; a first control unit for adjusting the first intensity parameter; a PLL circuit having a second intensity parameter relating to a synchronization of the clock signal for receiving the reproduced signal and for generating the clock signal synchronized with the reproduced signal based on the second intensity parameter, wherein the second intensity parameter has an initial value; and a second control unit for adjusting a value of the second intensity parameter; wherein the second control unit sets the second intensity parameter to a value larger than its value at the moment the clock signal is generated, and the first control unit sets the first intensity parameter to a value that is smaller than a predetermined value when the PLL circuit generates the clock signal synchronized with the reproduced signal.

The present invention further provides a data reading apparatus for reading data recorded on a recording medium, the data reading apparatus comprising: an A/D converter that receives a read signal and a clock signal, the read signal including the recorded data and a control data for controlling a read out operation of the recorded data, and converts the read signal synchronously with the clock signal into a digital signal; a storage unit that stores a coefficient in relation to a waveform shaping of the digital signal and an intensity parameter, wherein the intensity parameter has an initial value; and a processing unit that receives the digital signal and the clock signal, optimizes the coefficient synchronously with the clock using the intensity parameter and the digital signal, performs waveform shaping of the digital signal using optimized coefficient to generate a digital signal, and adjusts a value of the intensity parameter, wherein the processing unit sets the value of the intensity parameter to a value larger than the initial value when the processing unit optimizes the coefficient.

The present invention provides a method of reading data recorded on a recording medium, the method comprising the steps of: converting a read signal including the recorded data and control data for controlling a read out operation of the recorded data into a digital signal synchronously with a clock signal; optimizing a coefficient relating to a waveform shaping operation using an intensity parameter; performing waveform shaping of the digital signal in accordance with the optimized coefficient to generate a reproduced signal; and adjusting a value of the intensity parameter, wherein the adjusting step sets the value of the intensity parameter to a value larger than its initial value at the moment of the coefficient being optimized.

The present invention further provides a method of reading data on a recording medium, the method comprising the steps of: converting a read signal including the recorded data and a control data for controlling a read out operation of the recorded data into a digital signal synchronously with a clock signal; performing waveform shaping of the digital signal synchronously with the clock signal to generate a reproduced signal; generating the clock signal synchronized with the reproduced signal using an intensity parameter; and adjusting a value of the intensity parameter, wherein the adjusting step sets, in the clock signal generating step, the value of the intensity parameter to a value larger than a predetermined value.

The present invention provides a method of reading data recorded on a recording medium, the method comprising the steps of: converting a read signal including the recorded data and control data for controlling a read out operation of the recorded data into a digital signal synchronously with a clock signal; optimizing a coefficient relating to a waveform shaping synchronously with the clock signal using a first intensity parameter and the digital signal; performing waveform shaping of the digital signal in accordance with the optimized coefficient to generate a reproduced signal; generating the clock signal synchronized with the part of the reproduced signal originated from the control data, on the basis of a second intensity parameter; and adjusting values of the first and second intensity parameters, wherein in the step of generating the synchronized clock signal, the adjusting step includes the step of setting the value of the first intensity parameter to a value smaller than a predetermined value, and setting the value of the second intensity parameter to a value larger than a predetermined value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
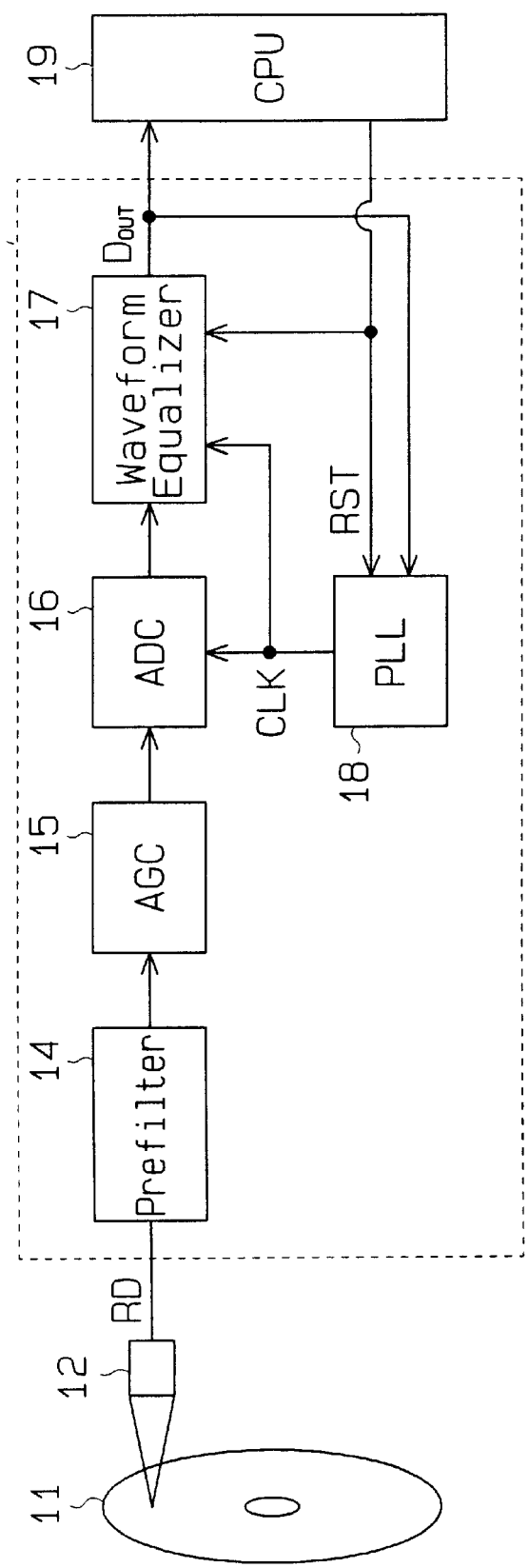
FIG. 1 is a block diagram of a conventional data reader.

A first embodiment of the present invention will now be described with reference to FIG. 3 to FIG. 9. In the drawings, like numerals are used for like elements.

Figure 3:
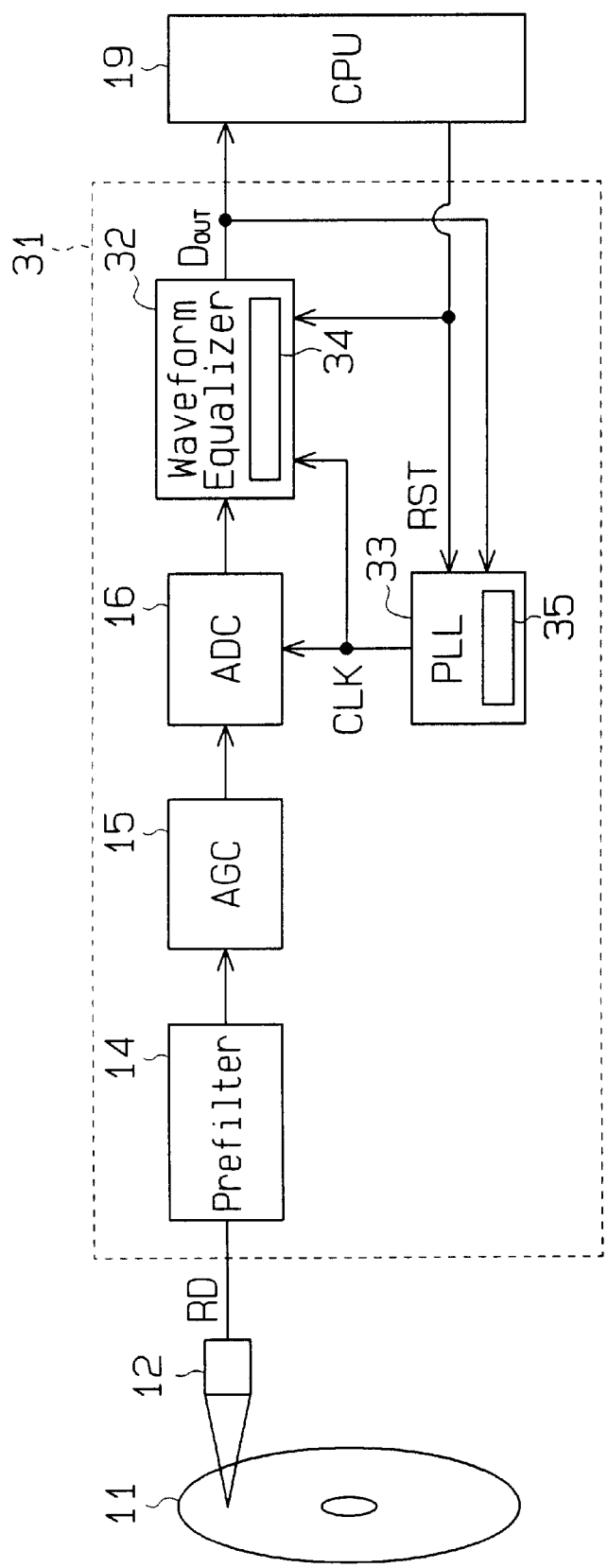
FIG. 3 is a schematic block diagram of a data reader according to one embodiment of the present invention.

Referring to FIG. 3, a data reader 31 includes a prefilter 14, an AGC 15, an ADC 16, a waveform equalizer 32, and a PLL circuit 33. The waveform equalizer 32 and the PLL circuit 33 include respective coefficient control circuits 34 and 35 for controlling intensity (sensitivity) parameters. The coefficient control circuits 34, 35 each control a first and a second intensity parameter "$\mu$" and "A" of the waveform equalizer 32 and the PLL circuit 33, in response to code read from the recording medium 11.

Figure 2:
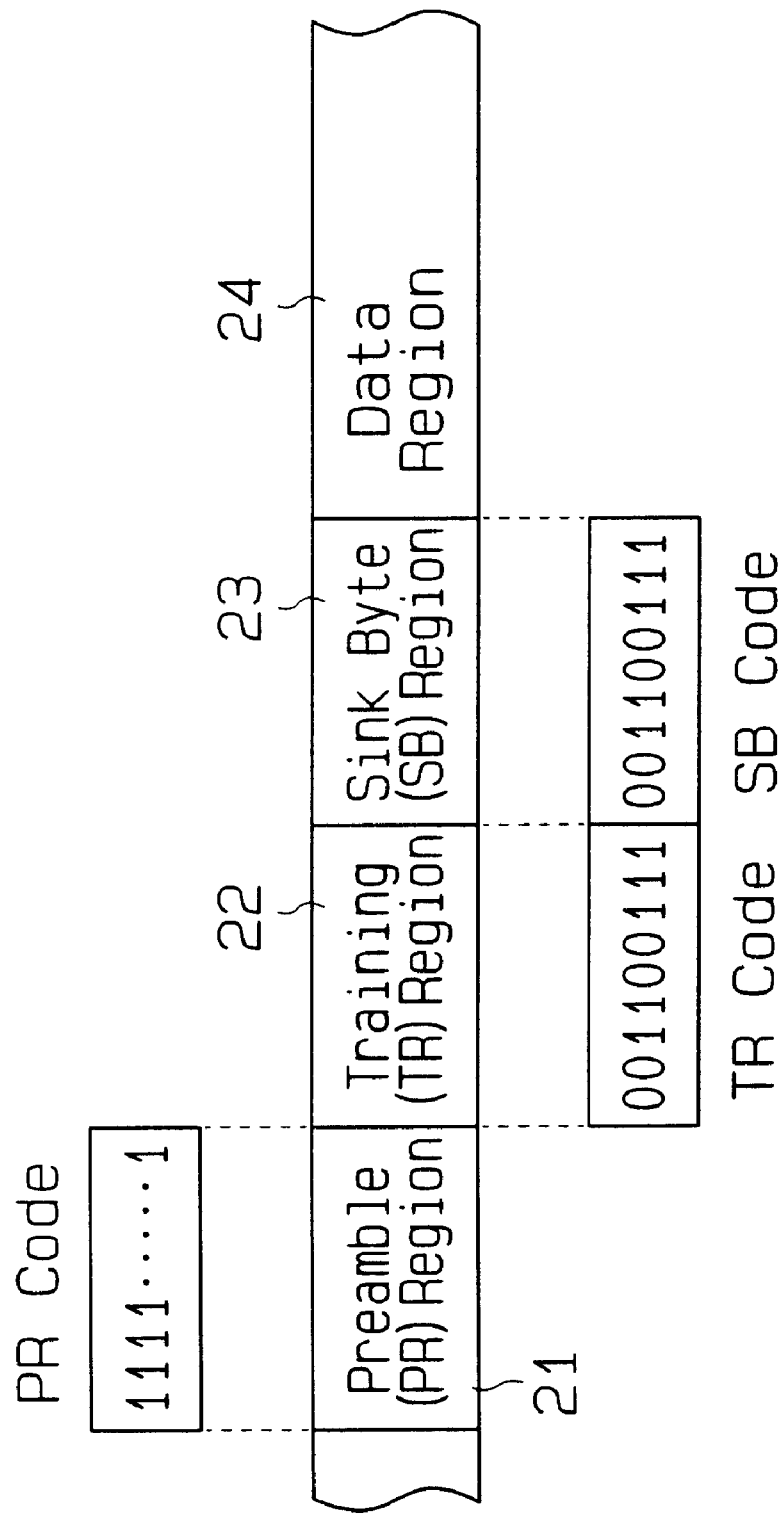
FIG. 2 is a diagram illustrating the format of read-out data.

As shown in FIG. 2, the preamble (PR) code is control data used for synchronizing the PLL circuit 33. In a first operation mode for synchronizing the clock signal CLK with the read signal RD containing the PR code read, the coefficient control circuit 35 of the PLL circuit 33 employs the second intensity parameter "A" having a large value compared to the first intensity parameter $\mu$. This enhances the response of the PLL circuit 33 to the PR code. On the other hand, in the first operation mode, the coefficient control circuit 34 of the waveform equalizer 32 employs the first intensity parameter $\mu$ having a small value compared to the second intensity parameter "A", which reduces the magnitude of variation in the waveform of the output signal. This brings the PLL circuit 33 into synchronization in a shorter time than the previously disclosed conventional data reader 13.

The training (TR) code (FIG. 2) is used for optimizing the waveform equalizer 32. The coefficient control circuit 34 of the waveform equalizer 32 increases the value of the first intensity parameter $\mu$ on the basis of the TR code in a second operation mode for optimizing the coefficient relating to the waveform shaping. This enhances the response of the waveform equalizer 32 to the TR code and optimizes the coefficient at a desired value in a shorter time than the prior art data reader 13. On the other hand, the coefficient control circuit 35 of the PLL circuit 33 decreases the value of the second intensity parameter "A" in the second operation mode. This decrease of the second intensity parameter "A" avoids an excessive response to the reproduced signal Dout, and allows the PLL circuit 33 to output the clock signal CLK having a stabilized frequency.

Figure 4:
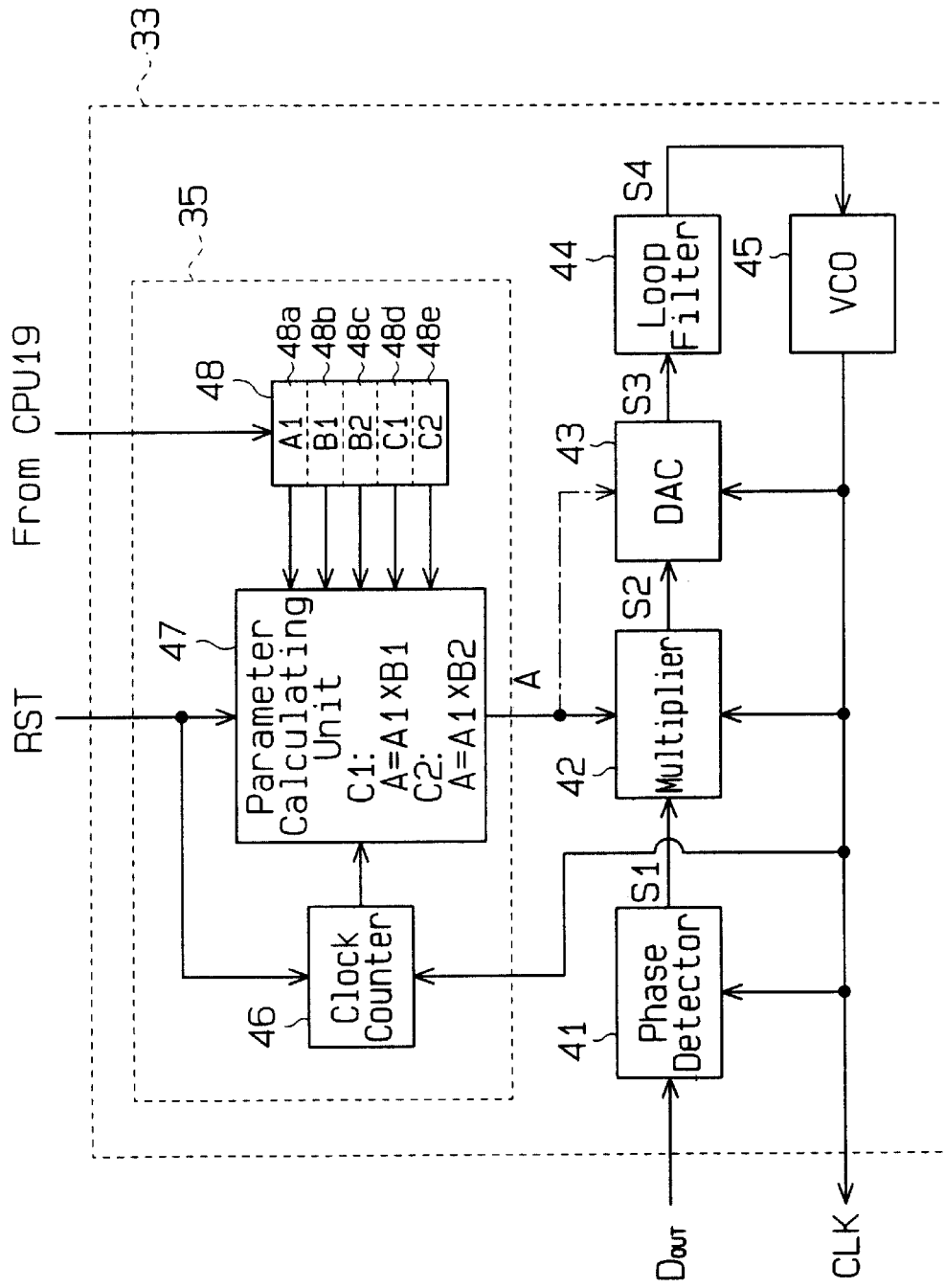
FIG. 4 is a schematic block diagram of a PLL circuit of the data reader of FIG. 3.

Referring to FIG. 4, the PLL circuit 33 is provided with a phase detector 41, a multiplier 42, a D/A converter (DAC) 43, a loop filter 44, and a voltage controlled oscillator (VCO) 45.

The phase detector 41 receives the reproduced signal Dout from the waveform equalizer 32 and the clock signal CLK and generates a signal S1 having a digital value corresponding to the phase difference between the signal Dout and the CLK. The signal S1 generated by the phase detector 41 has a larger value as the phase difference between the reproduced signal Dout and the clock signal CLK increases.

The multiplier 42 receives the signal S1 from the phase detector 41 and the second intensity parameter "A" from the coefficient control circuit 35, multiplies the signal S1 by the second intensity parameter "A", and outputs a signal S2 representing the operation result to the DAC 43.

The DAC 43 converts the signal S2 (digital signal) from the multiplier 42 to an analog signal S3 and outputs the analog signal S3 to the loop filter 44. The voltage of the analog signal S3 varies in correspondence with the phase difference between the reproduced signal Dout and the clock signal CLK.

The loop filter 44 smoothes the analog signal S3 and outputs a DC voltage signal S4. The VCO 45 receives the signal S4 from the loop filter 44 and generates the clock signal CLK having a frequency corresponding to the voltage of the signal S4. The clock signal CLK is then provided to the phase detector 41, the multiplier 42, and the DAC 43. Further, the VCO 45 delivers the clock signal CLK to the ADC 16 and the waveform equalizer 32 shown in FIG. 3. The data reader 31 sequentially processes the read signal RD synchronously with the clock signal CLK.

According to the present invention, the PLL circuit 33 increases or decreases the voltage of the output signal S4 from the loop filter 44 in correspondence with the phase difference between the reproduced signal Dout and the clock signal CLK. In this manner, the PLL circuit 33 brings the frequency of the clock signal CLK into coincidence with the frequency of the reproduced signal Dout when the PR code is being read. That is, the PLL circuit 33 locks the frequency.

The coefficient control circuit 35 includes a clock counter 46, a parameter calculating unit 47, and a register 48. The clock counter 46 receives the clock signal CLK from the VCO 45, counts the number of the rising edges (or falling edges) of the clock signal CLK, and outputs a digital signal representing the counted value to the parameter calculating unit 47. Further, the clock counter 46 receives a reset signal RST from the CPU 19 (FIG. 3) and clears (resets) the counted value in response to the reset signal RST. The CPU 19 outputs the reset signal RST when it detects that the reproduced signal Dout is the PR code read from the PR region 21.

Therefore, when the reading of the PR code starts, the parameter calculating unit 47 receives a digital signal that represents the counted value cleared from the clock counter 46. The counted value is represented by the number of the edges of the clock signal CLK coming into the clock counter 46 after the reading of the PR code starts. The number of the edges of the clock signal CLK corresponds to the number of bits of the PR code read. Thus, the parameter calculating unit 47 receives the counted value corresponding to the number of bits read from the beginning of the PR region 21.

The parameter calculating unit 47 is connected to the register 48. The register 48 includes first through fifth regions 48a–48e. The first region 48a is provided for storing an initial value A1 of the second intensity parameter "A". When receiving the cleared counted value (zero), the parameter calculating unit 47 reads out the initial value A1 of the second intensity parameter "A" stored in the first region 48a and outputs the value A1 to the multiplier 42.

The second and third regions 48b, 48c are provided for storing first and second coefficients B1, B2, respectively, being multipliers to the initial value A1. The parameter calculating unit 47 multiplies the initial value A1 by the first coefficient B1 and multiplies the initial value A1 by the second coefficient B2. The operation results are output to the multiplier 42 as the second intensity parameter "A".

The fourth and fifth regions 48d, 48e are provided for storing information that indicates timing for switching the value of the second intensity parameter "A", namely, counted values C1, C2. The counted values C1, C2 are set in advance in correspondence with the PR code and the TR code. The parameter calculating unit 47 compares the counted value from the clock counter 46 with the counted values C1, C2 in the fourth and fifth regions 48d, 48e to switch the value of the second intensity parameter "A". The parameter calculating unit 47 outputs the multiplied result of the initial value A1 and the first coefficient B1 as the second intensity parameter "A" (A1×B1), when the counted value from the clock counter 46 coincides with the counted value C1. When the counted value from the clock counter 46 coincides with the counted value C2, the parameter calculating unit 47 outputs the multiplied result of the initial value A1 and the second coefficient B2 as the second intensity parameter "A" (A1×B2).

The coefficient control circuit 35 alters the second intensity parameter "A" in correspondence with the codes input to the PLL circuit 33 and outputs the altered second intensity parameter "A" to the multiplier 42. The first and second coefficients B1, B2 are set so that the second intensity parameter "A" is smaller than the initial value A1 when the TR code is input to the PLL circuit 33. When the first region 48a stores "1", for example, as the initial value A1, the second region 48b stores "0.5", for example, as the first coefficient B1, and the third region 48c stores "0.1", for example, as the second coefficient B2.

Figure 5:
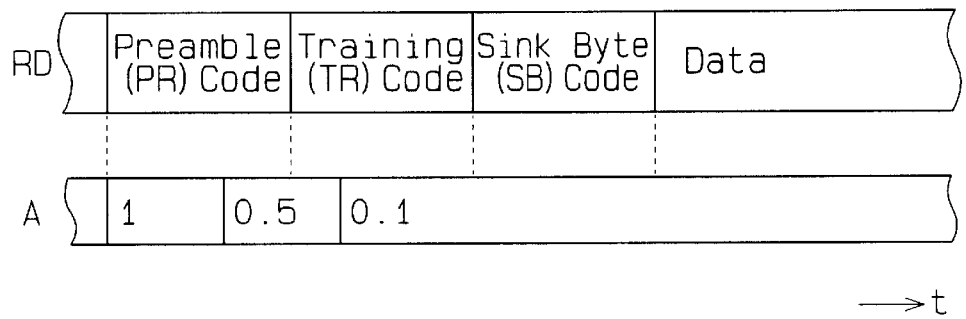
FIG. 5 is a schematic illustration of a read-out data and an intensity parameter.

As shown in FIG. 5, when the counted value is cleared, the parameter calculating unit 47 outputs the initial value "1" to the multiplier 42 as the second intensity parameter "A". At this moment, the PLL circuit 33 receives the PR code portion of the read signal RD.

When the counted value of the clock counter 46 coincides with the count value C1 stored in the fourth region 48d, the parameter calculating unit 47 outputs the value 0.5 (1×0.5), which is the multiplied result of the initial value A1 and the first coefficient B1, as the second intensity parameter "A". Thus, the value of the second intensity parameter "A" has been decreased to ½ of the initial value A1.

When the count value of the clock counter 46 coincides with the counted value C2 stored in the fifth region 48e, the parameter calculating unit 47 outputs the value 0.1 (1×0.1) which is the multiplied result of the initial value A1 and the second coefficient B2, as the second intensity parameter "A". The value of the second intensity parameter "A" is thus decreased to 1/10 of the initial value A1. At this moment, the PLL circuit 33 receives the TR code of the read signal RD.

In this manner, when the TR code is received, the value of the second intensity parameter "A" has been reduced to be smaller than that when receiving the PR code. Thus, the value of the second intensity parameter "A" is altered according to three levels "1", "0.5", and "0.1" in sequence.

The multiplier 42 multiplies the output signal from the phase detector 41 by the value of the second intensity parameter "A" and outputs the result to the DAC 43 as the signal S2. The value of the second intensity parameter "A" is controlled to increase when the PR code is read, and decrease when the TR code is read. Accordingly, when the output signal from the phase detector 41 is constant, the value of the signal S2 when the PR code is input is larger than that when the TR code is input. This increases the magnitude of variation in the output signal S4 from the loop filter 44 that is input to the VCO 45. Consequently, the frequency of the clock signal CLK varies greatly.

In other words, the PLL circuit 33 increases the magnitude of variation in the frequency of the clock signal CLK, which enhances its sensitivity. The PLL circuit 33 is able to lock the frequency of the clock signal CLK in a shorter time than the conventional data reader 13.

On the other hand, when the TR code is read, the value of the second intensity parameter "A" is small, which reduces the variation of the signal S4 from the loop filter 44. That is, the PLL circuit 33 lowers the sensitivity to the TR code. Thereby, the variation of frequency of the clock signal CLK against the variation of the reproduced signal Dout is lowered, which suppresses an excessive response. Thus, the frequency of the clock signal CLK is locked or stabilized.

Figure 6:
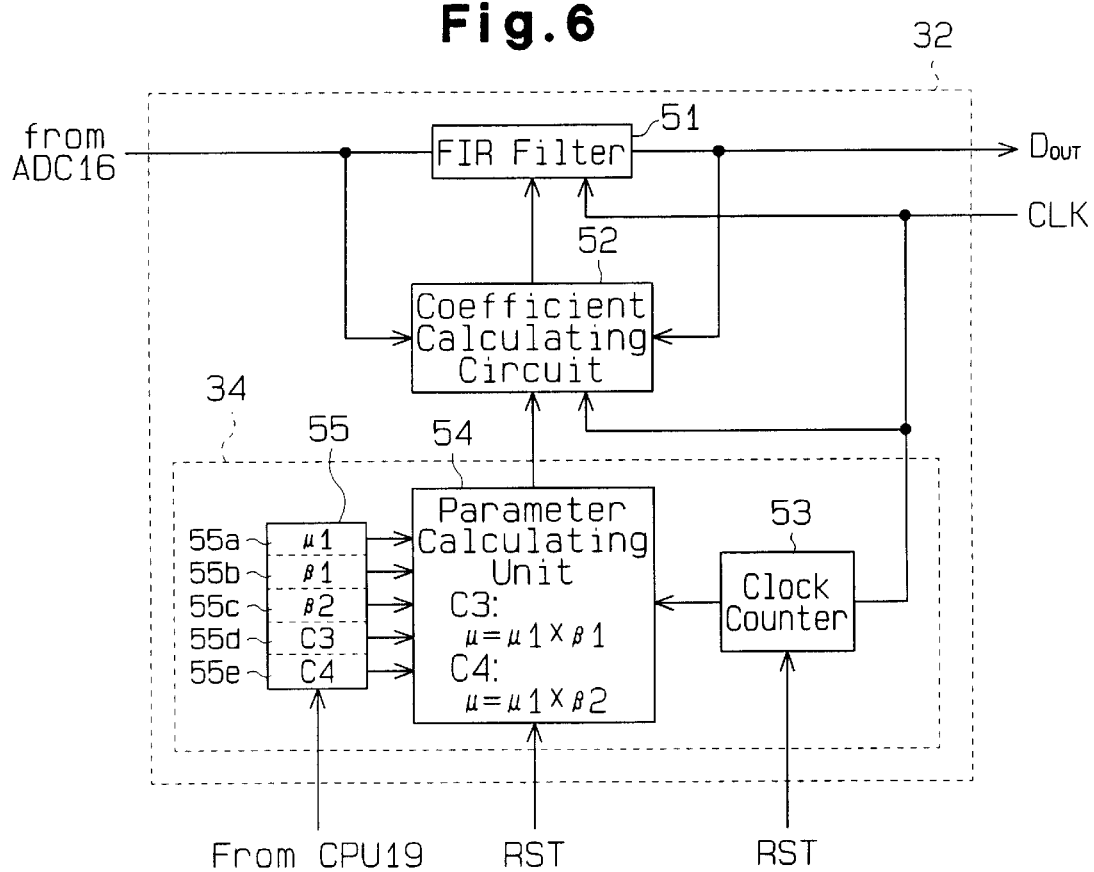
FIG. 6 is a schematic block diagram of a waveform equalizer of the data reader of FIG. 3.

As shown in FIG. 6, the waveform equalizer 32 includes a FIR filter 51, a coefficient calculating circuit 52, and a coefficient control circuit 34. The coefficient control circuit 34 includes a clock counter 53, a parameter calculating unit 54, and a register 55.

The clock counter 53 receives the clock signal CLK, and counts the number of the rising edges (or falling edges) of the clock signal CLK. The clock counter 53 outputs the counted value to the parameter calculating unit 54. Further, upon receiving a reset signal RST from the CPU 19 (FIG. 3), the clock counter 53 clears the counted value. Therefore, when the reading of the PR code starts, the parameter calculating unit 54 receives the counted value cleared from the clock counter 53. The counted value is represented by the number of the edges of the clock signal CLK coming into the clock counter 53 after the reading of the PR code starts. The number of the edges of the clock signal CLK corresponds to the number of bits of the PR code read out. Thus, the parameter calculating unit 54 receives the counted value corresponding to the number of bits read out from the beginning of the PR region 21.

The parameter calculating unit 54 is connected to the register 55. The register 55 includes first through fifth regions 55a–55e. The first region 55a is provided for storing an initial value $\mu 1$ of the first intensity parameter $\mu$. Upon receiving the cleared counted value (zero), the parameter calculating unit 54 reads out the initial value $\mu 1$ stored in the first region 55a and outputs the initial value $\mu 1$ to the coefficient calculating circuit 52.

The second and third regions 55b, 55c are provided for storing first and second coefficients $\beta 1$, $\beta 2$, respectively, being multipliers to the initial value $\mu 1$. The parameter calculating unit 54 multiplies the initial value $\mu 1$ by the first coefficient $\beta 1$ and multiplies the initial value $\mu 1$ by the second coefficient $\beta 2$. The operation results are output to the coefficient calculating circuit 52 as the first intensity parameter $\mu$.

The fourth and fifth regions 55d, 55e are provided for storing information to indicate a timing for switching the value of the first intensity parameter $\mu$, namely, counted values C3, C4. The counted values C3, C4 are set in advance in correspondence with the PR code and TR code stored by the CPU 19. The parameter calculating unit 54 switches the value of the first intensity parameter $\mu$ on the basis of the timing information stored in the fourth and fifth regions 55d, 55e.

The parameter calculating unit 54 compares the counted value from the clock counter 53 with the counted values C3, C4 in the fourth and fifth regions 55d, 55e. When the counted value from the clock counter 53 coincides with the counted value C3 in the fourth region 55d, the parameter calculating unit 54 multiplies the initial value $\mu 1$ by the first coefficient $\beta 1$ and outputs the result as the first intensity parameter $\mu$ ($\mu 1 \times \beta 1$). On the other hand, when the counted value from the clock counter 53 coincides with the counted value C4 in the fifth region 55e, the parameter calculating unit 54 multiplies the initial value $\mu 1$ by the second coefficient $\beta 2$ and outputs the result as the first intensity parameter $\mu$ ($\mu 1 \times \beta 2$). The coefficient control circuit 34 alters the first intensity parameter $\mu$ supplied to the coefficient calculating circuit 52 in correspondence with the codes input to the waveform equalizer 32.

The first and second coefficients $\beta 1$, $\beta 2$ are set so that the first intensity parameter $\mu$ increases to be larger than the initial value $\mu 1$ when the TR code of the read signal RD is input to the PLL circuit 33. Suppose that, for example, the first region 55a stores "0.001" as the initial value $\mu 1$, the second region 55b stores "5" as the first coefficient $\beta 1$, the third region 55c stores "10" as the second coefficient $\beta 2$, and the fourth and fifth regions 55d, 55e store the counted value C3, C4, respectively.

Figure 9:
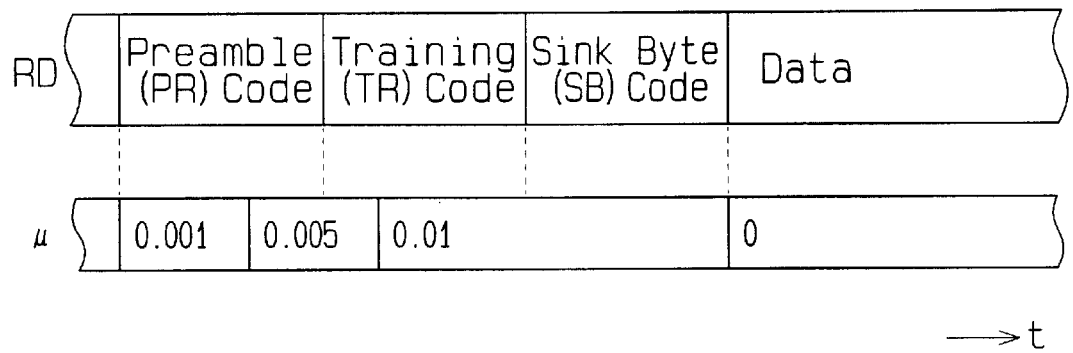
FIG. 9 is a schematic illustration of a read-out data and an intensity parameter.

As shown in FIG. 9, receiving the cleared counted value, first the parameter calculating unit 54 outputs the initial value "0.001" to the coefficient calculating circuit 52 as the first intensity parameter $\mu$. At this moment, the PLL circuit 33 receives the PR code portion of the read signal RD.

When the clock counter 53 coincides with the counted value C3 in the fourth region 55d, the parameter calculating unit 54 outputs the value 0.005 (0.001×5), being the multiplied result of the initial value µ1 and the first coefficient β1, to the coefficient calculating circuit 52 as the first intensity parameter µ. Thus, the value of the first intensity parameter µ is increased to 5 times of the initial value µ1.

Further, when the counted value of the clock counter 53 coincides with the counted value C4 in the fifth region 55e, the parameter calculating unit 54 outputs the value 0.01 (0.001×10), being the multiplied result of the initial value µ1 and the second coefficient β2, to the coefficient calculating circuit 52 as the first intensity parameter µ. Thus, the value of the first intensity parameter µ is increased to 10 times of the initial value µ1. At this moment, the PLL circuit 33 receives the TR code portion of the read signal RD. Therefore, when the TR code is input, the coefficient control circuit 34 outputs a value larger than the first intensity parameter µ when the PR code is input to the coefficient calculating circuit 52 as the first intensity parameter µ.

Further, the coefficient control circuit 34 may set the first intensity parameter µ to 0. For example, when the reading of the read signal RD having record data read out starts, the coefficient control circuit 34 sets the first intensity parameter µ to 0 on the basis of the instruction from the CPU 19. The coefficient control circuit 34 preferably alters the first intensity parameter µ by four levels: "0.001", "0.005", "0.01", and "0". In response to the first intensity parameter µ, the waveform equalizer 32 outputs input signals as the reproduced signal Dout without performing a waveform shaping. Namely, the waveform equalizer 32 stops the operation for the waveform equalization.

As shown in FIG. 6, the filter coefficient calculating circuit 52 outputs the value of the filter coefficient corresponding to the value of the first intensity parameter µ to the FIR filter 51. The value of the first intensity parameter µ is controlled to decrease when the PR code is input and to increase when the TR code is input. Accordingly, the value of the filter coefficient when the TR code is input is larger than that when the PR code is input.

The FIR filter 51 outputs a signal Y (reproduced signal Dout in FIG. 6) which is obtained by applying a waveform shaping to an input signal X on the basis of a filter coefficient. The FIR filter 51 adjusts the filtering characteristic in correspondence with the value of the filter coefficient input from the coefficient calculating circuit 52. The value of the filter coefficient is small when the PR code is input, and large when the TR code is input. Accordingly, the value of the reproduced signal Dout when the TR code is input is larger than that when the PR code is input.

In this manner, the waveform equalizer 32 alters the coefficient in correspondence with the PR or TR code. That is, the waveform equalizer 32 maintains the coefficient at a desired value by using a coefficient having a small value when the PR code is input. On the other hand, the waveform equalizer 32 increases the magnitude of variation of the coefficient during the input of the TR code. This shortens the time until the coefficient converges to a desired value, when the TR code for optimizing the coefficient of the waveform equalizer 32 is input. That is, the waveform equalizer 32 converges the coefficient faster than the conventional data reader 13 during the input of the TR code.

Figure 7:
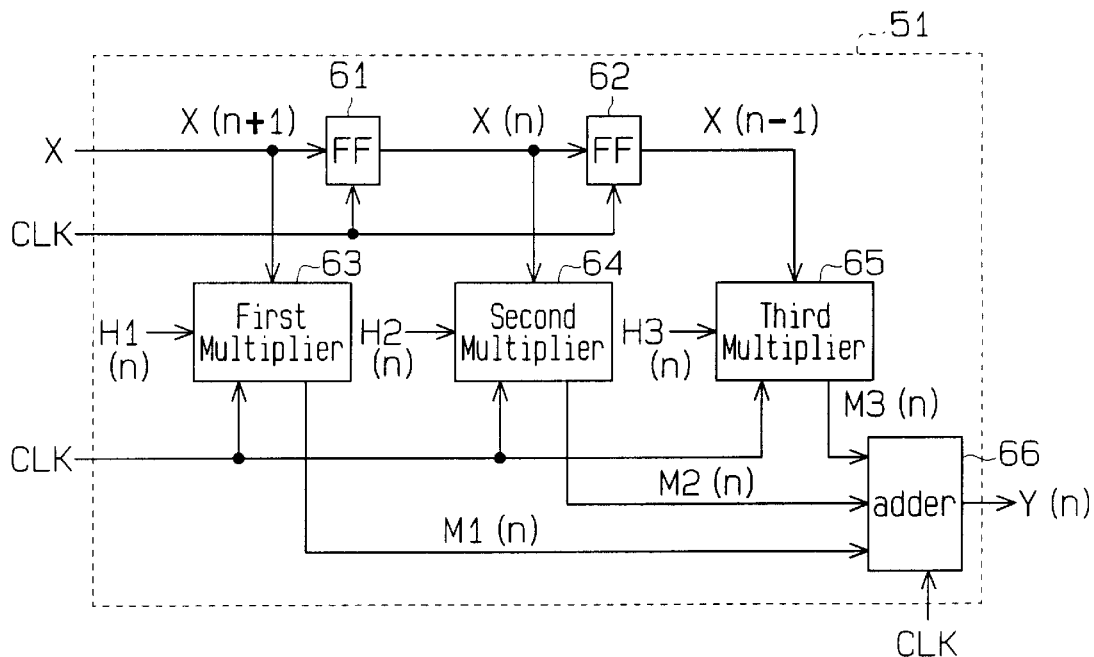
FIG. 7 is a schematic block diagram of a FIR filter of the waveform equalizer of FIG. 6.

As shown in FIG. 7, the FIR filter 51 includes flip-flops (FF) 61, 62, first through third multipliers 63–65, and an adder 66.

The FFs 61, 62 each receive the clock signal CLK at their clock input. The first FF 61 latches the input signal X synchronously with the clock signal CLK and outputs the latched signal to the second FF 62 and the second multiplier 64. The second FF 62 latches the signal from the first FF 61 synchronously with the clock signal CLK and outputs its latched signal to the third multiplier 65.

The first multiplier 63 receives the input signal X and a first filter coefficient H1, the second multiplier 64 receives the signal from the first FF 61 and a second filter coefficient H2, and the third multiplier 65 receives the signal from the second FF 62 and a third filter coefficient H3. The multipliers 63–65 each multiply the input signal X by the filter coefficients H1 to H3, respectively, and output signals M1 to M3 representing the operation results to the adder 66. The adder 66 adds the signals M1 to M3 from the first through third multipliers 63–65 synchronously with the clock signal CLK, and outputs the operation result as the output signal Y. The output signal Y is the reproduced signal Dout in FIG. 6.

First, the operation of the FIR filter 51 will be detailed. Suppose that the input signal to the FIR filter 51 is represented by X(n+1). At this moment, the first FF 61 latches a signal X(n) that was input one clock earlier. The second FF 62 latches a signal X(n−1) that was input two clocks earlier. In this manner, since the FIR filter 51 uses the signals that were input until two clocks earlier, the filter 51 has the second order.

The multipliers 63–65 each input the filter coefficients H1(n), H2(n), and H3(n), respectively. The first multiplier 63 multiplies the signal X(n+1) by the first filter coefficient H1(n) and outputs the signal M1(n) as the operation result. The second multiplier 64 multiplies the signal X(n) by the second filter coefficient H2(n) and outputs the signal M2(n) representing the operation result. The third multiplier 65 multiplies the signal X(n−1) by the third filter coefficient H3(n) and outputs the signal M3(n) representing the operation result. The adder 66 adds the signals M1(n) to M3(n) and outputs the signal Y(n) as the operation result.

Figure 8:
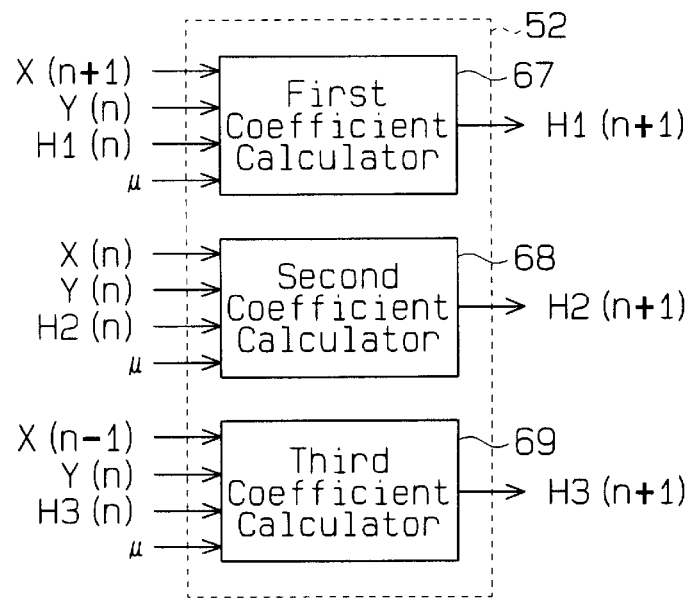
FIG. 8 is a schematic block diagram of a first embodiment of a coefficient calculating circuit in accordance with the present invention.

Next, the filter coefficient calculating circuit 52 will be detailed with reference to FIG. 8. As shown in FIG. 8, the filter coefficient calculating circuit 52 is provided with first through third coefficient calculators 67–69, which correspond to the first through third multipliers 63–65 of the FIR filter 51 in FIG. 7. The first through third coefficient calculators 67–69 are used to obtain the first through third filter coefficients H1 to H3 based on the well-known LMS method. Information concerning the LMS method may be found in "A guide to the adaptive filter" (the fourth chapter), written by S. Heikin, which is incorporated herein by reference. The first intensity parameter µ is treated as a step size in the LMS method.

The first through third coefficient calculators 67–69 calculate, on the basis of the filter coefficients H1(n) to H3(n) at time n, the first intensity parameter µ, the input signals X(n+1), X(n), X(n−1), and the filter coefficients H1(n+1) to H3(n+1) at time n+1 according to the following equations.

$$H1(n+1)=H1(n)+m \times E(n) \times X(n+1)$$

$$H2(n+1)=H2(n)+m \times E(n) \times X(n)$$

$$H3(n+1)=H3(n)+m \times E(n) \times (n-1)$$

Here, E(n) represents the difference between an ideal value D(n) in an ideal waveform and the output signal Y(n), which is given by the following.

$$E(n)=D(n)-Y(n)$$

Here, the ideal value D(n) is set to either one of "1", "−1", and "0" on the basis of the value of the output signal Y(n).

When the output signal Y(n) is larger than 0.5 (Y(n)>0.5), D(n)=1; when the output signal is smaller than −0.5 (Y(n<−0.5), D(n)=−1; and when the output signal Y(n) takes a value other than the foregoing values, D(n)=0.

As described above, according to the first embodiment, in the first operation mode for synchronizing the clock signal CLK on the basis of the PR code, the coefficient control circuit 34 of the waveform equalizer 32 employs the first intensity parameter $\mu$ having a comparably small value. In contrast, the coefficient control circuit 35 of the PLL circuit 33 employs the second intensity parameter "A" having a comparably large value. As a consequence, the PLL circuit 33 is able to synchronize the clock signal CLK being generated with the PR code of the read signal RD in a small space of time.

In the second operation mode for optimizing the coefficient of the waveform equalizer 32 on the basis of the TR code, the coefficient control circuit 35 decreases the value of the second intensity parameter "A". In contrast, the coefficient control circuit 34 increases the value of the first intensity parameter $\mu$. As a consequence, the waveform equalizer 32 is able to quickly optimize the coefficient to a desired value in the second operation mode.

It should be apparent to those skilled in the art that the present invention may be embodied in many other specific forms without departing from the spirit or scope of the invention. Particularly, it should be understood that the invention may be embodied in the following forms.

In order to calculate the intensity parameters A, $\mu$, in stead of multiplying the initial values A1, $\mu$1 by the coefficients B1, B2, $\beta$1, $\beta$2, the parameter calculating units 47, 54 may add or subtract the coefficients B1, B2, $\beta$1, $\beta$2 to or from the coefficients B1, B2, $\beta$1, $\beta$2.

Figure 10:
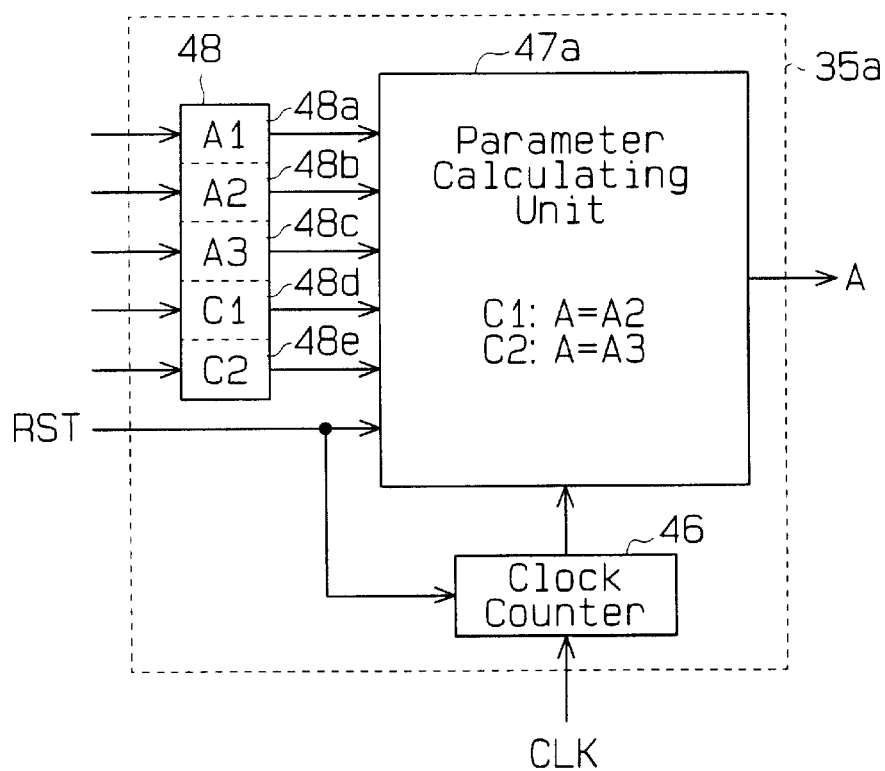
FIG. 10 is a schematic block diagram of a second embodiment of a coefficient control circuit.
Figure 11:
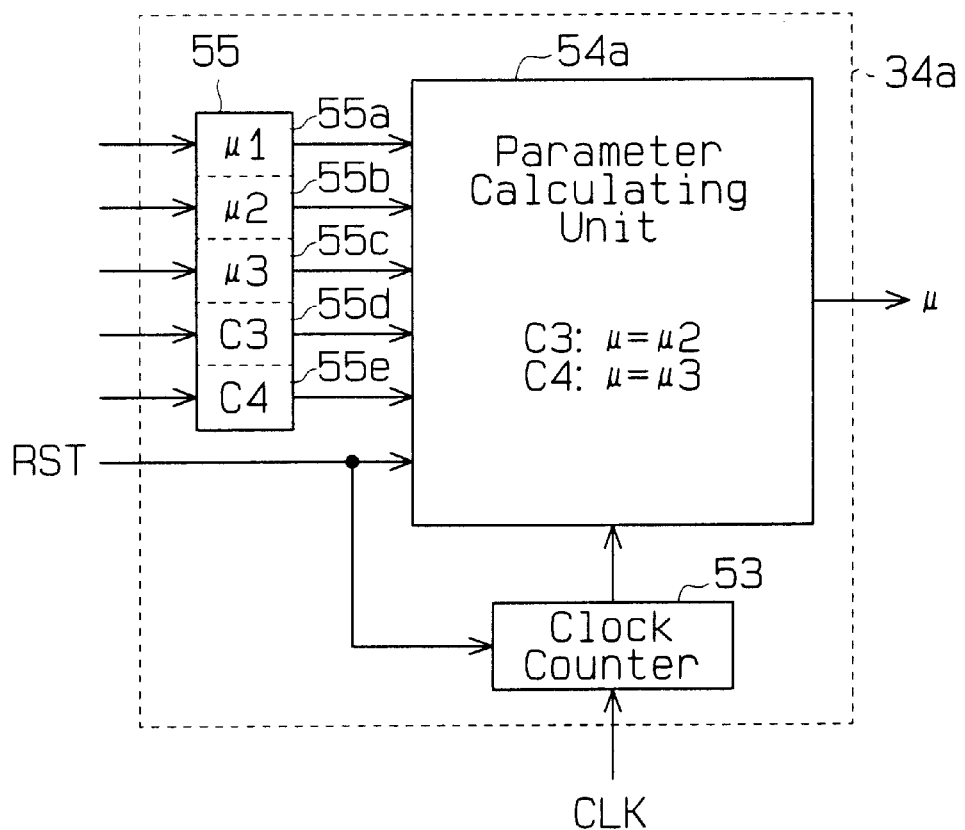
FIG. 11 is a schematic block diagram of a third embodiment of a coefficient control circuit.

Further, as shown in FIGS. 10 and 11, the registers 48, 55 may store the intensity parameters A, $\mu$, respectively. The parameter calculating unit 47a in FIG. 10 reads the value A2 in the second region 48b on the basis of the counted value C1 in the fourth region 48d and outputs the value A2 as the second intensity parameter "A". Further, the parameter calculating unit 47a reads out the value A3 in the third region 48c on the basis of the counted value C2 in the fifth region 48e and outputs the value A3 as the second intensity parameter "A".

The parameter calculating unit 54a in FIG. 11 reads out the value $\mu$2 in the second region 55b on the basis of the counted value C3 in the fourth region 55d and outputs the value $\mu$2 as the first intensity parameter $\mu$. Further, the parameter calculating unit 54a reads out the value $\mu$3 in the third region 55c on the basis of the counted value C4 in the fifth region 55e and outputs the value $\mu$3 as the first intensity parameter $\mu$.

This arrangement will simplify the circuit constructions of the parameter calculating units 47a, 54a. The arrangement not only reduces the circuit scale of the coefficient control circuits 35a, 34a, but also reduces the circuit scale of the data reader 31.

In the foregoing embodiment, the coefficient control circuit 35 of the PLL circuit 33 may alter the second intensity parameter "A" by two levels or more than four levels, instead of three levels. Similarly, the coefficient control circuit 34 of the waveform equalizer 32 may alter the first intensity parameter $\mu$ by two levels, three levels, or more than five levels, instead of four levels.

A digital filter such as an IIR (Infinite Impulse Response) filter or switched capacitor filter may be employed as an alternative of the FIR filter 51 in which case, the intensity (sensitivity) parameter of the digital filter may be controlled.

The order of the FIR filter 51 in the foregoing embodiment is defined as the second order. However, it may also be set to more than the third order.

Figure 12:
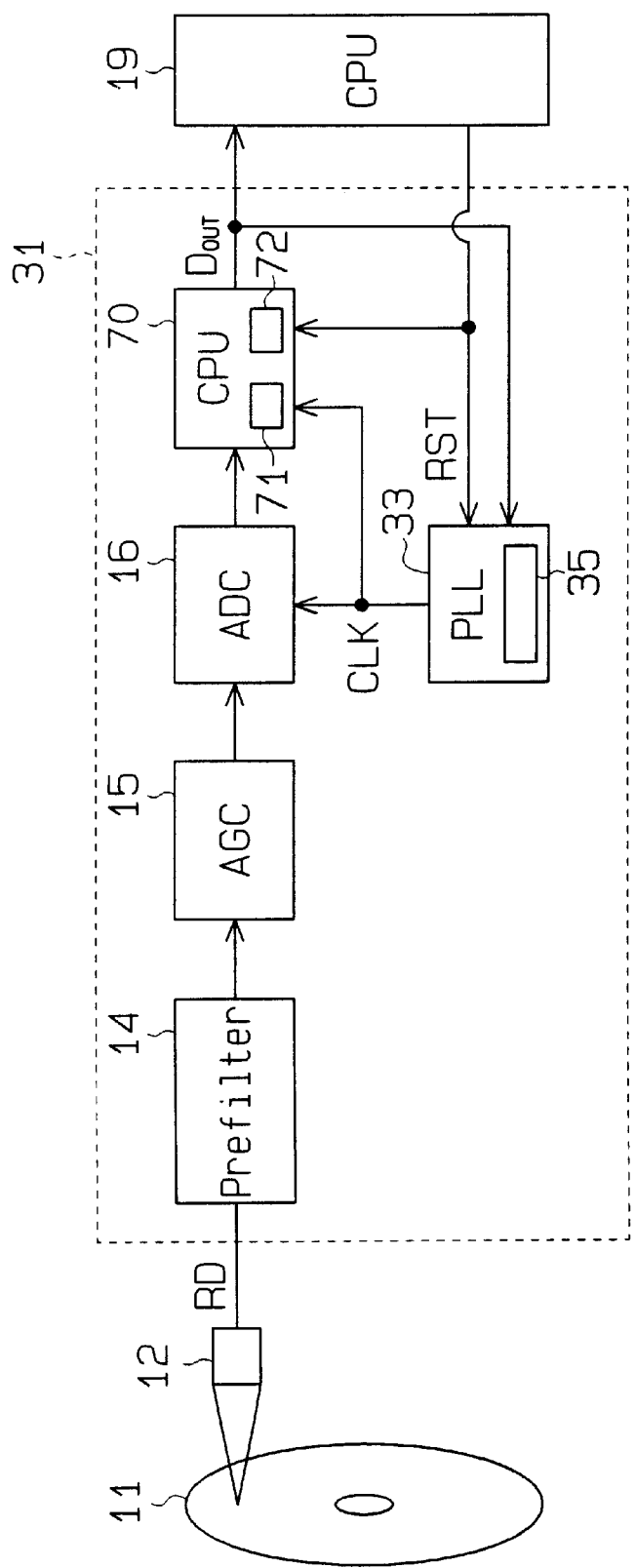
FIG. 12 is a schematic block diagram of a data reader according to a second embodiment of the present invention.

As shown in FIG. 12, the waveform equalizer 32 may be replaced by a CPU 70 including a ROM 71 and a RAM 72. The ROM 71 contains a program and data for the foregoing waveform shaping and a program and data for the coefficient alteration. These programs and data may be recorded on a recording medium (computer readable recording medium such as ROM, FD, CD-ROM). The RAM 72 contains the information stored in the registers 48, 55, namely, the initial value of the first intensity parameter $\mu$ and the like. The CPU 70 operates on the basis of the foregoing programs and data and outputs signals (digital signals) obtained by the waveform shaping of input signals. According to the construction, only a modification of the program is required to easily change the method of waveform shaping and the method of operation to alter the coefficient, the initial value, and other coefficients and the like.

In the foregoing embodiment, in pursuit of altering the intensity (sensitivity) parameter, the full range level of the DAC 43 in FIG. 4 may be altered. In this case, as shown by the dashed line in FIG. 4, the parameter calculating unit 47 outputs the second intensity parameter "A" to the DAC 43. The full range level of the DAC 43 is altered on the basis of the second intensity parameter "A". Suppose that the full range level of the DAC 43 is set to 0.2 volt, for example, and the output signal S3 of 0.1 volt is output in response to the input signal S2. When the full range level of the DAC 43 is altered to 0.4 volt, the DAC 43 outputs the output signal S3 of 0.2 volt to the same input signal S2. This is equivalent to the case where the multiplier 42 doubles the output. Therefore, this construction makes it possible to omit the multiplier 42 and reduce the number of devices that make up the PLL circuit 33, and to decrease the circuit scale of the data reader 31 in FIG. 3.

In the foregoing embodiment, the CPU 19 in FIG. 3 may detect the start of the data region 24 next to the training (TR) region 22. This makes it possible to read data recorded on a recording medium of which record format is not provided with the sink byte (SB) region 23 (see FIG. 2). The recording medium having this type of record format possesses a higher recording density because the data region 24 can be increased to the extent that the medium does not have the SB region 23. In the foregoing embodiment, either one of the coefficient control circuits 34, 35 for the waveform equalizer 32 and the PLL circuit 33 may be omitted. Also, the data reader 31 may be designed to contain the PLL circuit 33. However, the PLL circuit 33 may be formed on a chip separate from that for the waveform equalizer 32. In other words, the data reader 31 may be configured with a plurality of chips.

The present examples and embodiments are to be considered as illustrative and not restrictive and the invention is not to be limited to the details given herein, but may be modified within the scope and equivalence of the appended claims.

What is claimed is:

1. A data reading apparatus for reading data recorded on a recording medium, the data reading apparatus comprising:
   an A/D converter that receives a read signal and a clock signal, the read signal including the recorded data and a control data for controlling a read out operation of the recorded data, and converts the read signal into a digital signal synchronously with the clock signal; and
   a waveform equalizer having a coefficient relate to a waveform of the digital signal and an intensity parameter, wherein the waveform equalizer receives the digital signal and the clock signal, optimizes the coefficient synchronously with the clock signal by an operation employing the intensity parameter and the digital signal, and shapes the waveform of the digital signal in accordance with the optimized coefficient to generate a reproduced signal, wherein:

the intensity parameter has a predetermined initial value, the waveform equalizer includes a control unit for adjusting a value of the intensity parameter, and the control unit sets the value of the intensity parameter to a value larger than the initial value when the waveform equalizer optimizes the coefficient.

2. The data reading apparatus according to claim 1, further comprising a PLL circuit that receives the reproduced signal and generates the clock signal, wherein the control unit sets the value of the intensity parameter to a value less than a value at the moment of the coefficient being optimized, when the PLL circuit generates the clock signal.

3. The data reading apparatus according to claim 2, wherein the waveform equalizer optimizes the coefficient after the PLL circuit generates the clock signal, and the control unit increases the intensity parameter from the initial value from the moment the PLL circuit generates the clock signal to the moment the waveform equalizer optimizes the coefficient.

4. The data reading apparatus according to claim 2, wherein the waveform equalizer employs an LMS method to shape the waveform of the digital signal, and the waveform equalizer comprises:

a digital filter that receives the digital signal, performs the waveform shaping of the digital signal synchronously with the clock signal, and generates the reproduced signal; and a coefficient calculating circuit that receives the digital signal and the intensity parameter and calculates the coefficient of the digital filter synchronously with the clock signal using the digital signal and the intensity parameter as a step size in the LMS method.

5. The data reading apparatus according to claim 2, wherein the control unit comprises:

a register for storing data relating to the intensity parameter; and a calculating unit for calculating the intensity parameter in accordance with the data in the register.

6. The data reading apparatus according to claim 5, wherein the register stores the initial value of the intensity parameter, an arithmetic value applied to the intensity parameter initial value, and timing data to indicate an arithmetic timing of the intensity parameter;

the control unit includes a counter for receiving the clock signal and counting the clock signal to determine the arithmetic timing; and the calculating unit updates the intensity parameter using the arithmetic value when a counted value of the counter coincides with the timing data.

7. The data reading apparatus according to claim 6, wherein the arithmetic value includes a plurality of different values, the timing data includes a plurality of different values, and the calculating unit updates the intensity parameter by a frequency corresponding to the number of the arithmetic value in accordance with the timing data.

8. A data reading apparatus for reading data recorded on a recording medium, the data reading apparatus comprising:

an A/D converter that receives a read signal and a clock signal, the read signal including the recorded data and control data for controlling a read out operation of the recorded data, and converts the read signal synchronously with the clock signal into a digital signal;

a waveform equalizer for shaping a waveform of the digital signal and generating a reproduced signal; and a PLL circuit for generating the clock signal synchronized with the reproduced signal using an intensity parameter, wherein:

the intensity parameter has an initial value, the PLL circuit includes a control unit for adjusting a value of the intensity parameter, and the control unit adjusts the value of the intensity parameter to a value larger than a predetermined value when the PLL circuit generates the clock signal synchronized with the reproduced signal.

9. The data reading apparatus according to claim 8, wherein the waveform equalizer has a coefficient relating to the waveform shaping and the control unit sets the intensity parameter to a value smaller than its value at the moment that the PLL circuit generates a synchronized clock signal.

10. The data reading apparatus according to claim 9, wherein the control unit comprises a register for storing data relating to the intensity parameter and a calculating unit for calculating the intensity parameter in accordance with the data in the register.

11. The data reading apparatus according to claim 10, wherein the register stores the initial value of the intensity parameter, an arithmetic value applied to the initial value, and the timing data to indicate an arithmetic timing of the intensity parameter; and the control unit includes a counter for receiving the clock signal and counting the clock signal to determine the arithmetic timing, wherein the calculating unit updates the intensity parameter using the arithmetic value when the counter coincides with the timing data.

12. The data reading apparatus according to claim 11, wherein the arithmetic value includes a plurality of different values, the timing data includes a plurality of different values, and the calculating unit updates the intensity parameter by a frequency corresponding to the number of the arithmetic value in accordance with the timing data.

13. The data reading apparatus according to claim 8, wherein the waveform equalizer optimizes the coefficient after the PLL circuit generates the synchronized clock signal, and the control unit decreases the intensity parameter from the initial value from the moment the PLL circuit generates the synchronized clock signal to the moment that the waveform equalizer optimizes the coefficient.

14. The data reading apparatus according to claim 8, wherein the PLL circuit comprises:

a phase detector that receives the reproduced signal and the clock signal for generating a phase difference signal corresponding to a phase difference between the reproduced signal and the clock signal;

an amplifier that receives the phase difference signal and the intensity parameter for multiplying the phase difference signal by the intensity parameter, and generating a signal representing the operation result;

a D/A converter to convert the output signal of the amplifier to an analog signal; and a voltage controlled oscillator to output the clock signal having a frequency corresponding to a voltage of the analog signal.

15. The data reading apparatus according to claim 8, wherein the PLL circuit comprises:
- a phase detector that receives the reproduced signal and the clock signal for generating a phase difference signal corresponding to a phase difference between the reproduced signal and the clock signal;
- an amplifier to amplify the phase difference signal and output an amplified signal;
- a D/A converter that receives the amplified signal and the intensity parameter, and converts the amplified signal to an analog signal at a full range level corresponding to the intensity parameter; and
- a voltage controlled oscillator to generate the clock signal having a frequency corresponding to a voltage of the analog signal.

16. A data reading apparatus for reading data recorded on a recording medium, the data reading apparatus comprising:
- an A/D converter that receives a read signal and a clock signal, the read signal including the recorded data and control data for controlling a read out operation of the recorded data, and converts the read signal to a digital signal synchronously with the clock signal;
- a waveform equalizer having a coefficient in relation to a waveform shaping of the digital signal and a first intensity parameter, receives the digital signal and the clock signal, optimizes the coefficient synchronously with the clock signal using the first intensity parameter and the digital signal, and performs waveform shaping of the digital signal in accordance with the optimized coefficient and the first intensity parameter to generate a reproduced signal, wherein the intensity parameter has an initial value;
- a first control unit for adjusting the first intensity parameter;
- a PLL circuit having a second intensity parameter relating to a synchronization of the clock signal for receiving the reproduced signal and for generating the clock signal synchronized with the reproduced signal based on the second intensity parameter, wherein the second intensity parameter has an initial value; and
- a second control unit for adjusting a value of the second intensity parameter;
- wherein the second control unit sets the second intensity parameter to a value larger than its value at the moment the clock signal is generated, and the first control unit sets the first intensity parameter to a value that is smaller than a predetermined value when the PLL circuit generates the clock signal synchronized with the reproduced signal.

17. The data reading apparatus according to claim 16, wherein the first control unit sets the first intensity parameter to a value larger than its value at the moment of the clock signal is generated, and the second control unit sets the second intensity parameter to its value that is smaller than a value at the moment the clock signal is generated, when the waveform equalizer optimizes the coefficient.

18. The data reading apparatus according to claim 17, wherein the waveform equalizer optimizes a coefficient after the PLL circuit generates a synchronized clock signal, and the first control unit decreases the first intensity parameter from the initial value, the second control unit decreases the second intensity parameter from the initial value, from the moment the PLL circuit generates the synchronized clock signal to the moment the waveform equalizer optimizes the coefficient.

19. The data reading apparatus according to claim 17, wherein the waveform equalizer employs an LMS method to perform the waveform shaping of the digital signal, and the waveform equalizer comprises:
- a digital filter that receives the digital signal for performing the waveform shaping of the digital signal synchronously with the clock signal, and for generating the reproduced signal; and
- a coefficient calculating circuit that receives the digital signal and the first intensity parameter for calculating the coefficient of the digital filter synchronously with the clock signal by an operation employing the digital signal and the first intensity parameter as a step size in the LMS method.

20. The data reading apparatus according to claim 17, wherein the PLL circuit comprises:
- a phase detector that receives the reproduced signal and the clock signal for generating a phase difference signal corresponding to a phase difference between the reproduced signal and the clock signal;
- an amplifier that receives the phase difference signal and the second intensity parameter for multiplying the phase difference signal by the second intensity parameter, and generating a signal representing the operation result;
- a D/A converter to convert the amplified signal to an analog signal; and
- a voltage controlled oscillator to output the clock signal having a frequency corresponding to a voltage of the analog signal.

21. The data reading apparatus according to claim 17, wherein the PLL circuit comprises:
- a phase detector that receives the reproduced signal and the clock signal for generating a phase difference signal corresponding to a phase difference between the reproduced signal and the clock signal;
- an amplifier to amplify the phase difference signal and output an amplified signal;
- a D/A converter that receives the amplified signal and the second intensity parameter, and converts the amplified signal to an analog signal at a full range level corresponding to the second intensity parameter; and
- a voltage controlled oscillator to generate the clock signal having a frequency corresponding to the analog signal.

22. The data reading apparatus according to claim 17, wherein the first control unit comprises a register for storing data relating to the first intensity parameter and a calculating unit for calculating the first intensity parameter in accordance with the data stored in the register.

23. The data reading apparatus according to claim 22, wherein:
- the register stores the initial value of the first intensity parameter, an arithmetic value applied to the initial value, and timing data to indicate an arithmetic timing of the intensity parameter; and
- the first control unit includes a counter for receiving the clock signal and counting the clock signal to determine the arithmetic timing, wherein
- the calculating unit updates the first intensity parameter using the arithmetic value when a counted value of the counter coincides with the timing data.

24. The data reading apparatus according to claim 23, wherein the arithmetic value includes a plurality of different values, the timing data includes a plurality of different values, and the calculating unit updates the first intensity parameter by a frequency corresponding to the arithmetic value in accordance with the timing data.

25. The data reading apparatus according to claim 17, wherein the second control unit comprises a register for storing data relating to the second intensity parameter and a calculating unit for calculating the second intensity parameter in accordance with the data stored in the register.

26. The data reading apparatus according to claim 25, wherein:

the register stores the initial value of the second intensity parameter, an arithmetic value applied to the initial value, and timing data to indicate an arithmetic timing of the intensity parameter; and the second control unit includes a counter for receiving the clock signal and counting the clock signal to determine the arithmetic timing, wherein the calculating unit updates the second intensity parameter using the arithmetic value when a counted value of the counter coincides with the timing data.

27. The data reading apparatus according to claim 26, wherein the arithmetic value includes a plurality of different values, the timing data includes a plurality of different values, and the calculating unit updates the second intensity parameter by a frequency corresponding to the arithmetic value in accordance with the timing data.

28. A data reading apparatus for reading data recorded on a recording medium, the data reading apparatus comprising:

an A/D converter that receives a read signal and a clock signal, the read signal including the recorded data and a control data for controlling a read out operation of the recorded data, and converts the read signal synchronously with the clock signal into a digital signal;

a storage unit that stores a coefficient in relation to a waveform shaping of the digital signal and an intensity parameter, wherein the intensity parameter has an initial value; and a processing unit that receives the digital signal and the clock signal, optimizes the coefficient synchronously with the clock using the intensity parameter and the digital signal, performs waveform shaping of the digital signal using optimized coefficient to generate a digital signal, and adjusts a value of the intensity parameter, wherein the processing unit sets the value of the intensity parameter to a value larger than the initial value when the processing unit optimizes the coefficient.

29. A method of reading data recorded on a recording medium, the method comprising the steps of:

converting a read signal including the recorded data and control data for controlling a read out operation of the recorded data into a digital signal synchronously with a clock signal;

optimizing a coefficient relating to a waveform shaping operation using an intensity parameter;

performing waveform shaping of the digital signal in accordance with the optimized coefficient to generate a reproduced signal; and adjusting a value of the intensity parameter, wherein the adjusting step sets the value of the intensity parameter to a value larger than its initial value at the moment of the coefficient being optimized.

30. The method of reading data according to claim 29, further comprising the step of generating the clock signal synchronized with the reproduced signal, wherein the adjusting step sets, in the clock signal generating step, the value of the intensity parameter to a value smaller than a value at the moment of the coefficient being optimized.

31. The method of reading data according to claim 30, wherein the waveform shaping step comprises:

generating the reproduced signal using a digital filter in compliance with an LMS method, and calculating the coefficient synchronously with the clock signal on the basis of the digital signal and the intensity parameter as a step size in the LMS method.

32. A method of reading data on a recording medium, the method comprising the steps of:

converting a read signal including the recorded data and a control data for controlling a read out operation of the recorded data into a digital signal synchronously with a clock signal;

performing waveform shaping of the digital signal synchronously with the clock signal to generate a reproduced signal;

generating the clock signal synchronized with the reproduced signal using an intensity parameter; and adjusting a value of the intensity parameter, wherein the adjusting step sets, in the clock signal generating step, the value of the intensity parameter to a value larger than a predetermined value.

33. The method of reading data according to claim 32, wherein the waveform shaping step includes the step of optimizing a coefficient relating to the waveform shaping using the digital signal, and the adjusting step includes the step of setting, in the synchronized clock signal generating step, the value of the intensity parameter to a value smaller than a value at the moment of the coefficient being optimized.

34. The method of reading data according to claim 33, wherein the synchronized clock signal generating step comprises the steps of:

generating a phase difference signal corresponding to a phase difference between the reproduced signal and the clock signal;

multiplying the intensity parameter by the phase difference signal;

converting the multiplied result into an analog signal; and outputting a clock signal having a frequency corresponding to a voltage of the analog signal.

35. The method of reading data according to claim 33, wherein the synchronized clock signal generating step comprises the steps of:

generating a phase difference signal corresponding to a phase difference between the reproduced signal and the clock signal;

multiplying the intensity parameter by the phase difference signal;

converting the multiplied result into an analog signal at a full range level based on the intensity parameter; and controlling the full range level with the intensity parameter.

36. A method of reading data recorded on a recording medium, the method comprising the steps of:

converting a read signal including the recorded data and control data for controlling a read out operation of the recorded data into a digital signal synchronously with a clock signal;

optimizing a coefficient relating to a waveform shaping synchronously with the clock signal using a first intensity parameter and the digital signal;

performing waveform shaping of the digital signal in accordance with the optimized coefficient to generate a reproduced signal;

generating the clock signal synchronized with the part of the reproduced signal originated from the control data, on the basis of a second intensity parameter; and adjusting values of the first and second intensity parameters, wherein in the step of generating the synchronized clock signal, the adjusting step includes the step of setting the value of the first intensity parameter to a value smaller than a predetermined value, and setting the value of the second intensity parameter to a value larger than a predetermined value.

37. The method of reading data according to claim 36, wherein the adjusting step sets, in the clock signal generating step, the value of the first intensity parameter to a value smaller than a value at the moment of the coefficient being optimized.

38. The method of reading data according to claim 37, wherein the waveform shaping step comprises:

generating the reproduced signal using a digital filter in compliance with an LMS method, and calculating the coefficient synchronously with the clock signal on the basis of the digital signal and the first intensity parameter as a step size in the LMS method.

39. The method of reading data according to claim 37, wherein the synchronized clock signal generating step comprises the steps of:

generating a phase difference signal corresponding to a phase difference between the reproduced signal and the clock signal;

multiplying the second intensity parameter by the phase difference signal;

converting the multiplied result to an analog signal; and outputting the clock signal having a frequency corresponding to a voltage of the converted analog signal.

40. The method of reading data according to claim 37, wherein the synchronized clock signal generating step comprises the steps of:

generating a phase difference signal corresponding to a phase difference between the reproduced signal and the clock signal;

multiplying the second intensity parameter by the phase difference signal;

converting the multiplied result into an analog signal at a full range level based on the second intensity parameter; and controlling the full range level with the second intensity parameter.

41. A recording medium having a computer readable program for reading data, wherein the program code performs the steps of:

converting a read signal including the read data and control data into a digital signal synchronously with a clock signal;

optimizing a coefficient relating to a waveform shaping synchronously with the clock signal using an intensity parameter and the part of the digital signal originated from the control data;

performing waveform shaping of the digital signal in accordance with the optimized coefficient to generate a reproduced signal; and adjusting a value of the intensity parameter, wherein the adjusting step includes the step of setting the value of the intensity parameter to a value larger than its initial value.

42. A recording medium having a computer readable program for reading data, wherein the program code performs the steps of:

converting a read signal including the read data and control data into a digital signal synchronously with a clock signal;

performing waveform shaping of the digital signal synchronously with the clock signal to generate a reproduced signal;

generating the clock signal synchronized with the part of the reproduced signal originated from the control data using an intensity parameter; and adjusting a value of the intensity parameter, wherein the adjusting step sets, in the synchronized clock signal generating step, the value of the intensity parameter to a value larger than a predetermined value.

43. A recording medium having a computer readable program reading data, wherein the program code performs the steps of:

converting a read signal including the read data and control data into a digital signal synchronously with a clock signal;

optimizing a waveform shaping using a first intensity parameter and the digital signal originated from the control data;

performing waveform shaping of the digital signal in accordance with the optimized coefficient to generate a reproduced signal;

generating the clock signal synchronized with the part of the reproduced signal originated from the control data using a second intensity parameter; and adjusting the first and second intensity parameters, wherein, in the step of generating the synchronized clock signal, the adjusting step including the steps of:
setting the value of the first intensity parameter to a value smaller than a predetermined value; and
setting the value of the second intensity parameter to a value larger than a predetermined value.

* * * * *